United States Patent
Concra

[11] Patent Number: 5,110,295
[45] Date of Patent: May 5, 1992

[54] EDUCATIONAL TRACING DEVICE

[76] Inventor: Christina T. Concra, 14 Huckleberry La., Ballston Lake, N.Y. 12019

[21] Appl. No.: 612,409

[22] Filed: Nov. 13, 1990

[51] Int. Cl.⁵ .............................................. G09B 11/04
[52] U.S. Cl. ...................................... 434/88; 434/368; 434/370; 434/416
[58] Field of Search ...................... 434/79, 81, 85, 88, 434/89, 150, 153, 368, 370, 408, 413, 416, 430

[56] References Cited

U.S. PATENT DOCUMENTS

| | | |
|---|---|---|
| 320,564 | 6/1885 | Klemm . |
| 636,319 | 11/1899 | Camp .................................... 434/81 |
| 2,258,603 | 10/1941 | Forbell .................................. 434/88 |
| 2,323,521 | 7/1943 | De Journette . |
| 3,447,250 | 6/1969 | Van Savage .......................... 434/84 |
| 3,492,743 | 2/1970 | Schmidt . |
| 3,768,177 | 10/1973 | Thomas . |

FOREIGN PATENT DOCUMENTS 1141123  3/1957  France ................................. 434/150

Primary Examiner—Richard J. Apley
Assistant Examiner—Karen Richard
Attorney, Agent, or Firm—Schmeiser, Morelle & Watts

[57] ABSTRACT

An educational training device in which a plurality of transparent sheets and base sheets are secured in fixed registry onto a top surface of a frame. A student can trace patterns shown on the base sheets onto the transparent sheets. The student can also remove and/or rearrange any of the sheets to thereby study the different interrelationships between the patterns. In addition, a top transparent sheet can be marked upon to draw a pattern that is extrapolated from the data provided by the underlying sheets.

10 Claims, 2 Drawing Sheets

EDUCATIONAL TRACING DEVICE

FIELD OF THE INVENTION

The invention is in the field of educational devices. More particularly, the invention is a learning system in which the student forms a number of different overlays by tracing information from at least one base sheet that displays a pattern. The student is then able to configure the overlays in any desired manner to thereby teach the interrelationships between a plurality of different patterns.

BACKGROUND OF THE INVENTION

It is a well known teaching practice to reinforce verbally or visually provided information by having the student copy the information onto a piece of paper or a blackboard. For example, a geography teacher may show a student a map and then have the student draw a copy of the map. This forces the student to concentrate on the subject and also to compare his or her own hand drawn map to the originally displayed map. In this manner, the student uses a number of different mental processes to fully learn the information being taught.

One device commonly used in conjunction with this teaching method is tracing paper. The student places the tracing paper over the original and makes a copy of it on the top surface of the tracing paper using a suitable writing utensil.

There have been a number of patented inventions that can also be used in conjunction with this teaching method.

Schmidt (U.S. Pat. No. 3,492,743) teaches an apparatus in which a plurality of opaque data sheets are used in combination with a single translucent sheet. Each of the data sheets shows a certain type of figure. The student traces the figure from each data sheet onto the translucent sheet and thereby forms a cumulative final picture in which all the figures shown on all the data sheets are combined.

Thomas (U.S. Pat. No. 3,768,177) shows a device in which a background sheet is placed onto a holding surface. A number of cut-out units are then placed onto the background sheet to form a combined pattern. A transparent sheet can be placed onto the formed pattern and additional patterns can be drawn onto the transparent sheet and thereby be in effect added to the background pattern.

While many devices in the prior art employ the use of a single transparent sheet, none allow the student to make and combine multiple transparent sheets. The use of multiple transparent sheets as a teaching aid is a well known concept often seen in the bound volumes of encyclopedias. For example, the human anatomy section of an encyclopedia may include a plurality of transparent sheets with different aspects of the human body shown on each sheet. The student can view them singly or in combined fashion to learn the relative positions of the different detailed portions of the anatomy.

However, the above noted use of bound transparencies does not lend itself to variations of the information presented. The transparent sheets cannot be removed, redrawn or reordered. In addition, a blank transparent sheet or similar structure is not provided to allow the student to trace the depicted information. If the teacher wished to provide unbound copies of the transparent sheets, expensive and often unavailable equipment would be required to copy the patterned transparent sheets onto blank transparent sheets.

The prior art does not provide any means whereby a student can effectively form his or her own teaching device. The student is limited to a rote tracing of subject matter without the ability to combine tracings and thereby to develop a new pattern. In addition, there is no apparatus available that enables the student to stack the tracings in a different order and thereby teach a related concept or the inter-relationships between different patterns.

SUMMARY OF THE INVENTION

The invention is an educational aid that allows the student to learn information by a copying process and also allows the student to combine the copied information in a number of different ways.

There are four basic parts of the invention. The first part is a rigid frame that has a flat top surface. The frame includes two vertically extending registration members proximate one edge of the top surface. The second part of the invention is a plurality of opaque base sheets that are each marked with a different indicia/pattern of data. Each base sheet is of a predetermined size and includes two holes adjacent one edge located and sized to receive the above noted registration members. The third part of the invention is a plurality of transparent sheets that also include two holes adjacent one edge for receiving the registration members. The transparent sheets are preferably of the same predetermined size as the base sheets. The last part of the invention is a writing utensil capable of writing on the transparent sheets.

The invention is used by first placing a base sheet that displays a specific pattern on its top surface onto the registration members of the frame. The top surface of the frame is sized to allow the base sheet to lay flat on the surface in a fully supported manner with the pattern displayed upwardly. For example, a typical base sheet/transparent sheet size is $8\frac{1}{2} \times 11$ inches. The frame's top surface in this case would be approximately $10 \times 12$ inches. Preferably, the frame will be sized to support the largest sheet envisioned to be placed upon its surface.

Next, a first transparent sheet is placed atop the base sheet with the frame's registration members passing through the two holes in the transparent sheet. In this way, the transparent sheet is held in fixed registry with the base sheet. Preferrably, the transparent sheet is made from a clear plastic material. The user then traces the pattern displayed on the base sheet onto the top surface of the first transparent sheet. To accomplish the tracing, a wax pencil type of writing utensil may be employed.

The student then lifts the first transparent sheet off the frame and places a second base sheet showing a new pattern onto the registration members of the frame. The first transparent sheet is again placed onto the frame's registration members and lies atop the newly added base sheet. The user then places a second transparent sheet onto the frame's registration members in a position atop the first transparent sheet. At this point, the user can see the pattern shown on the topmost base member and the pattern he or she drew on the first transparent sheet (a copy of the information originally displayed on the first base member). The user then traces the pattern shown on the topmost base member onto the second, topmost transparent sheet. Following this can be one or more iterations of adding a new base sheet and copying the new pattern onto a blank topmost transparent sheet.

In this manner, the user separately traces and learns each new pattern. By combining the tracings, the user can see the interrelationships between the patterns. At any time, the user can remove any of the transparent sheets or rearrange their order to reinforce the taught interrelationship or to display new interrelationships. In addition, the topmost transparent sheet can be used by the student to display extrapolated patterns not shown by the underlying sheets.

To produce the various base sheets for use with the invention, an original master sheet is made. The master sheet is then easily reproduced using a standard copier to thereby provide a large number of duplicate base sheets. In this way, an individual student can be supplied with a number of different base sheets at a minimum of cost. This is extremely advantageous when compared to the costs that would be incurred if the teacher wished to provide each student with a series of premarked transparent sheets.

DETAILED DESCRIPTION OF THE DRAWINGS

Figure 1:
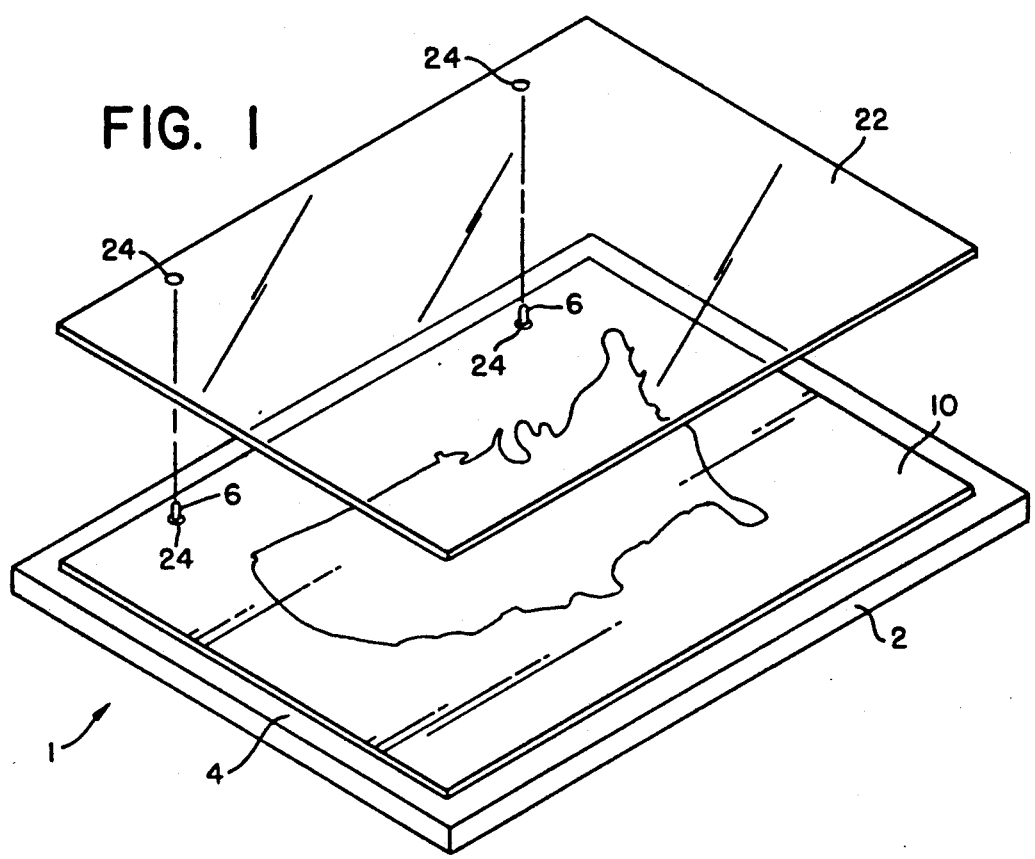
FIG. 1 shows the initial set-up of the invention with the first base sheet already located on the frame and the first transparent sheet being added.

Referring now to the drawings in greater detail, wherein like reference characters refer to like parts throughout the several figures, there is shown by the numeral 1 a tracing device used for educational purposes.

FIG. 1 shows the device in a beginning stage of use. The invention comprises a rigid frame 2 that is rectangular in shape and has a flat top surface 4. Near a top edge of the frame's top surface are located a pair of vertically extending registration pins 6.

Figure 2:
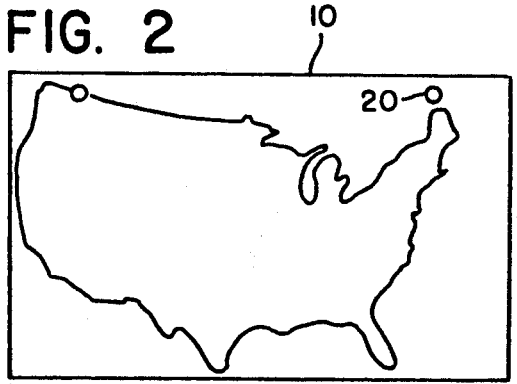
FIG. 2 shows a first example of a base sheet in which an outline of the United States displayed on the sheet's top surface.
Figure 3:
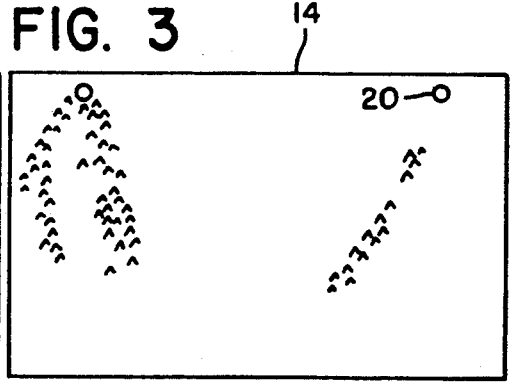
FIG. 3 shows a second example of a base sheet in which the major mountain ranges of the United States are shown on the sheet's top surface.
Figure 4:
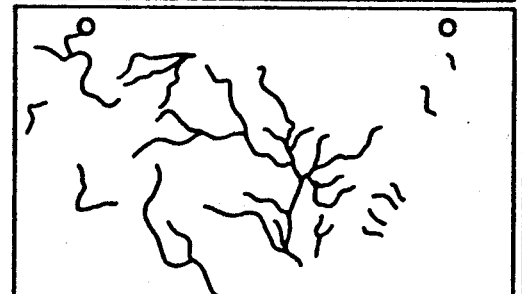
FIG. 4 shows a third example of a base sheet in which the major rivers of the United States are shown on the sheet's top surface.
Figure 5:
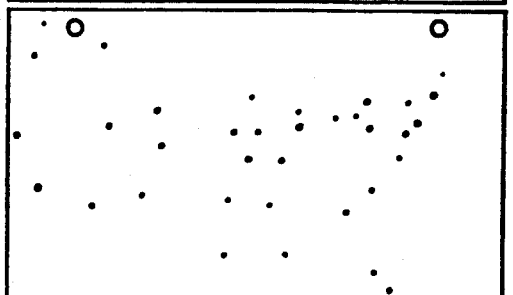
FIG. 5 shows a fourth example of a base sheet in which the major cities of the United States are displayed on the sheet's top surface.

An example of a base sheet 10 is shown placed on the top surface of the frame. FIGS. 2-5 show typical examples of base sheets 10, 14, 16 and 18 that can be used. Each base sheet is opaque and has a predetermined pattern on its top surface. The pattern may be in the form of a shape (such as shown in FIG. 2) or be in the form of a pattern of lines or dots that are used to modify a basic shape. Each base sheet includes two holes 20 that are sized and located to receive the registrations pins 6.

As also seen in FIG. 1, a transparent sheet 22 is placed on top of the base sheet. The transparent sheet also has two holes 24 adjacent its top edge that are sized and spaced to receive the registration pins 6. By placing the sheet onto the frame with the two holes engaging the pins 6, the transparent sheet is locked into a fixed registry with any underlying sheets. Once the transparent sheet is in place, the student traces the pattern from the underlying base sheet onto the top surface of the transparent sheet.

Figure 6:
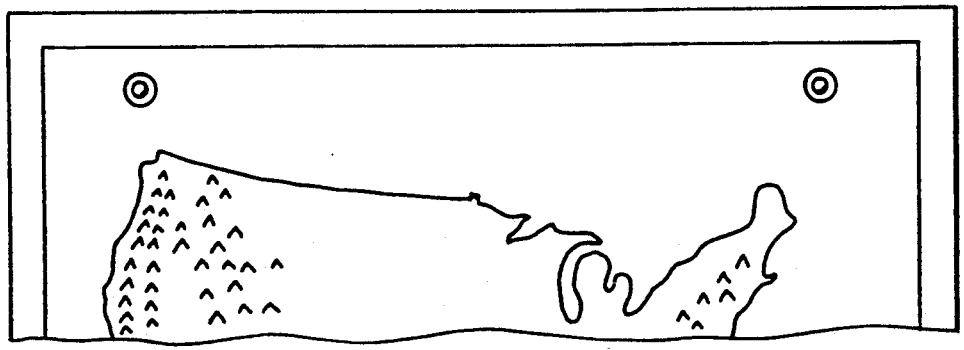
FIG. 6 shows the top half of the invention including two base sheets and two transparent sheets.
Figure 7:
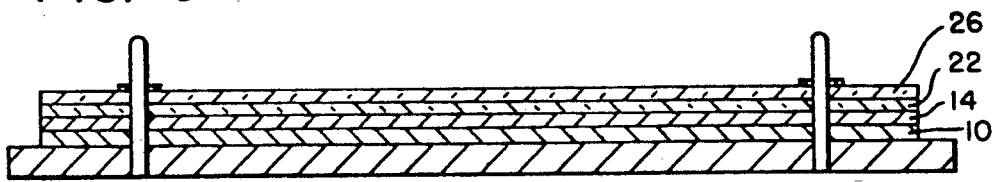
FIG. 7 is a cross-sectional view of the invention shown in FIG. 6.

FIGS. 6 and 7 show the invention in a later stage of use. In these figures, it can be seen that a second base sheet 14 has been placed atop the first base sheet 10. On top of the second base sheet rests the transparent sheet 22 that at this stage has traced upon it the pattern shown on the first base sheet 10. A second transparent sheet 26 has also been added to the stack of sheets.

FIG. 7 provides a cross-sectional view of the device shown in FIG. 6 and provides a detailed view of the placement of the various sheets.

Figure 8:
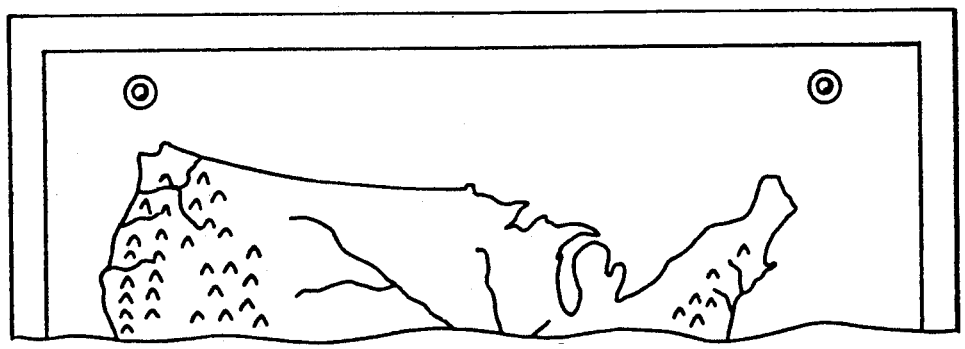
FIG. 8 shows the top half of the invention including three base sheets and three transparent sheets.
Figure 9:
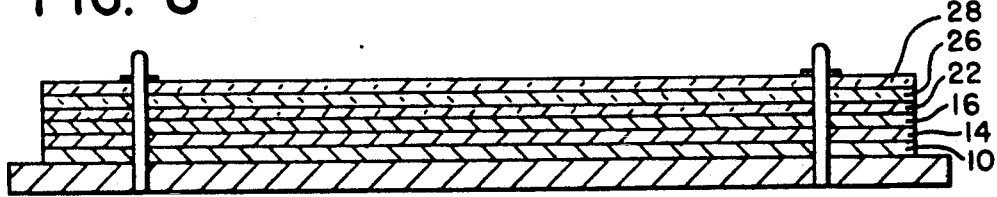
FIG. 9 is a cross-sectional view of the invention shown in FIG. 8.

FIGS. 8 and 9 show the invention in a further stage of use from that shown in FIGS. 6 and 7. In these figures, three base sheets 10, 14 and 16 are stacked atop the frame. Three transparent sheets 22, 26 and 28 are stacked atop the base sheets. As can be seen, the information that was shown on base sheets 10 and 14 has been traced on the transparent sheets 22 and 26 respectively. The student traces the information shown on base sheet 16 onto the top surface of the topmost transparent sheet 28.

Figure 10:
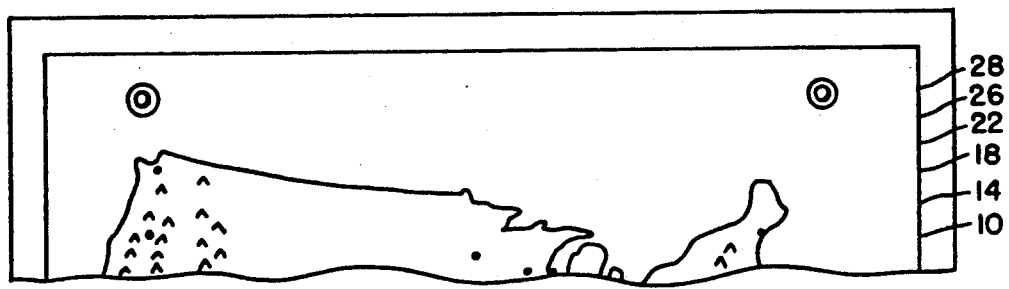
FIG. 10 shows the top half of the invention including three base sheets and three transparent sheets with one of the base sheets being different from one of the base sheets used in the invention shown in FIG. 8.

FIG. 10 shows the invention in an equivalent stage of use to that shown in FIG. 7. However, in this figure the bottom three sheets are bases 10, 14 and 18. Stacked on these bases are three transparent sheets 22, 26 and 28. The patterns shown on base sheets 10 and 14 have already been traced onto transparent sheets 22 and 26 respectively. The student then marks a pattern onto the topmost transparent sheet that is related to the information displayed by the underlying sheets.

To use the device, one first places a prepared opaque base sheet onto the top of the frame. When any sheet is placed on the frame, its top holes are first aligned with the frame's registration pins and then the sheet is pressed downwardly. This effectively ensures the registry of the sheet to the frame and to any other sheets similarly positioned. While two registration pins are shown, it should be noted that any other similar registration/securement apparatus may be employed (e.g., more than two pins, one or more clips, etc.)

Next, a transparent sheet preferably made from plastic acetate is placed on the frame atop the base sheet (this is shown in FIG. 1). The student then traces the pattern/design shown on the base sheet onto the transparent sheet. The tracing can be accomplished using a wax-type pencil or other type of marker capable of writing on a plastic surface.

For example and as shown in FIG. 1, the base sheet may shown an outline of the United States. The student traces the outline onto the top surface of the transparent sheet. At this point, the device is similar to the use of tracing paper. However, the frame and pins prevent any inadvertent movement of either of the sheets.

Once the first tracing has been made, the student remove the top transparent sheet and places a second base sheet on top of the first base sheet. Once the second base sheet is in place, the first base sheet is completely hidden from view by the newly added base sheet. Alternatively, prior to adding the new base sheet, the student may remove the base sheet(s) already located on the frame. Removal of the prior base sheets has no effect on the student since they cannot be seen through the topmost base sheet and also, the information on the previous base sheet(s) will already have been copied onto the transparent sheet(s).

After the second base sheet is in place, the student replaces the first transparent sheet (that has the pattern of the first base sheet traced on its surface) onto the frame. The student then places an unmarked transparent sheet atop the first transparent sheet. At this point, the student can see the pattern shown on the second base sheet and juxtaposed upon it, the pattern that was traced onto the first transparent sheet. The student can then trace the second base sheet's pattern onto the newly added (topmost) transparent sheet. This step is shown in FIGS. 6 and 7.

The above procedure can then be repeated with a third base sheet. This is shown in FIGS. 8 and 9.

At any point, a slightly different method of use can be practiced with the invention.

For example, in FIG. 8 and 9, base sheets 10, 14 and 16 have been placed onto the frame. The patterns from base sheets 10 and 14 have been traced onto transparent sheets 22 and 26. The student may then trace the pattern from base sheet 16 onto transparent sheet 28. An additional transparent sheet (not shown) can then be added to the stack. At this point the student can view through the top transparent sheet the outline of the United States with the mountains and rivers detailed.

The device can now be used to test or to teach the students grasp of geography in relation to its effect on man. The teacher can ask the student to mark onto the top transparent sheet the most likely areas for the location of major cities. The student would then extrapolate the solution from the underlying sheets and proceed to, for example, color in the coastal areas exterior to any mountain ranges. The student would also most likely color in areas along major rivers and especially any major junction points between rivers. The river's outlet points to the oceans might also be marked by the student. At this point, the four transparent sheets can be removed and the base sheet 18 (showing the locations of the major cities) can be placed on the frame. The transparent sheets are replaced and the student can compare his or her guesses for the city locations (shown on the top transparent sheet) to their actual locations (shown on base sheet 18).

FIG. 10 shows a similar setup to that shown in FIGS. 8 and 9. However, a different set of bases (10,16 and 18) have been used to teach a slightly different relationship. In this latter arrangement, the student can see the locations of the major cities of the United States relative to the outline of the country (from base sheet 10) and to the position of the mountains (from base sheet 14). The student can then study this arrangement and mark on a transparent sheet added to the top of the stack the probable locations of rivers (i.e. —where there are cities but no other topographical explanation for their location). This latter example shows how at any point, the bases and transparent sheets can be removed or rearranged to teach different concepts.

While the invention is particularly suited for use with maps, it can be used to teach any other type of information in which multiple patterns are combined.

The embodiment of the invention disclosed herein has been discussed for the purpose of familiarizing the reader with the novel aspects of the invention. Although a preferred embodiment of the invention has been shown and described, many changes, modifications and substitutions may be made by one having ordinary skill in the art without necessarily departing from the spirit and scope of the invention.

I claim:

1. An educational device comprising:
    a frame means having a substantially rigid, flat top surface;
    a plurality of opaque base sheets wherein each base sheet has indicia on a top surface thereof and, wherein at least two of said base sheets have indicia on their top surfaces that provide related information;
    a plurality of transparent sheets wherein each sheet has a surface capable of being marked upon; and
    a registration means operatively connected to said frame means for removably securing to said frame means in a stacked manner and in a fixed registry at least one base sheet and at least two transparent sheets wherein said at least one base sheet is located atop the top surface of said frame means and wherein at least two transparent sheets are located atop the base sheet.

2. The device of claim 1 further comprising a marking means capable of placing marks on a surface of each of said transparent sheets.

3. The device of claim 1 wherein said registration means comprises a plurality of extension members that extend outwardly from a surface of said frame means and wherein each of said sheets include a complementary plurality of holes sized and located to inwardly receive said extension members.

4. The device of claim 3 wherein said outwardly extending members are located proximate an outer edge of said top surface of said frame means.

5. A method of learning comprising:
    placing a first opaque base sheet in fixed registry onto a top surface of a frame wherein said first base sheet has a first predetermined pattern on a top surface thereof;
    placing a first transparent sheet on top of and in fixed registry with said first base sheet;
    tracing the pattern shown on said first base sheet onto a top surface of said transparent sheet using a marking means;
    removing said first transparent sheet from the frame;
    placing a second opaque base sheet onto the frame wherein said second base sheet has a second predetermined pattern on a top surface thereof and wherein the second predetermined pattern is different from the first predetermined pattern;
    placing said first transparent sheet onto the frame whereby it is located on top of the second base sheet;
    placing a second transparent sheet onto the frame on top of said first transparent sheet; and
    marking a pattern onto a top surface of said second transparent sheet.

6. The method of claim 5 the marking of the second transparent sheet comprises tracing the pattern shown on said second base sheet onto the top surface of said second transparent sheet using a marking means.

7. The method of claim 5 further comprising the step of placing a third transparent sheet onto the frame on top of said second transparent sheet and using a marking means to mark a top surface of said third transparent sheet with a pattern that is different from the patterns marked on either of said first or second transparent sheets.

8. The method of claim 7 wherein the user can remove either of the first or second transparent sheets and then have displayed on the device a new pattern upon which another transparent sheet is placed and the user then marks the newly added sheet.

9. An educational device comprising:
a frame means having a substantially rigid, flat top surface;
a first base sheet having a first preprinted pattern located on a top surface thereof;
a second base sheet having a second preprinted pattern located on a top surface thereof and wherein the first of said preprinted patterns is different in appearance from the second of said patterns;
a first transparent sheet having upon a top surface thereof an erasable copy of the first pattern, said copy having been made by the user;
a second transparent sheet having upon a top surface thereof an erasable copy of the second pattern, said copy having been made by the user; and
a registration means operatively connected to said frame means for removably securing to said frame means in a stacked manner and in a fixed registry at least said second base sheet and at least two transparent sheets wherein said first and second transparent sheets are located atop the second base sheet.

10. The device of claim 9 further comprising a third transparent sheet located atop the first and second transparent sheets wherein said third transparent sheet has located upon a top surface thereof a third pattern made by the user wherein said third pattern was extrapolated by the user from the first and second patterns.

* * * * *